United States Patent [19]

Holt

[11] Patent Number: 4,617,462

[45] Date of Patent: Oct. 14, 1986

[54] POLARIZED INTERNAL TARGET APPARATUS

[75] Inventor: Roy J. Holt, Downers Grove, Ill.

[73] Assignee: The United States of America as represented by the United States Department of Energy, Washington, D.C.

[21] Appl. No.: 659,587

[22] Filed: Oct. 10, 1984

[51] Int. Cl.[4] .......................... H01S 1/00; H01S 9/00; H05H 3/02

[52] U.S. Cl. .................................... 250/251; 376/107; 376/127; 376/130; 376/915; 324/304

[58] Field of Search ................ 250/251; 376/107, 127, 376/130, 915; 324/304, 308

[56] References Cited

U.S. PATENT DOCUMENTS 3,577,026 5/1971 Haeberli .......................... 250/493.2

4,005,355 1/1977 Happer et al. ..................... 324/304

OTHER PUBLICATIONS

"Polarized Internal Targets in Storage Rings: A Wish for Aladdin", Holt, *Magnetic Spectrometer Workshop,* Williamsburg, Va., 10/10–12/83.

*Primary Examiner*—Bruce C. Anderson

*Attorney, Agent, or Firm*—William Lohff; Robert J. Fisher; Judson R. Hightower

[57] ABSTRACT

A polarized internal target apparatus with a polarized gas target of improved polarization and density achieved by mixing target gas atoms with a small amount of alkali metal gas atoms, and passing a high intensity polarized light source into the mixture to cause the alkali metal gas atoms to become polarized which interact in spin exchange collisions with target gas atoms yielding polarized target gas atoms.

2 Claims, 5 Drawing Figures

POLARIZED INTERNAL TARGET APPARATUS

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

In the experimental study of nuclear physics, an invaluable tool includes the use of a particle accelerator and target. An accelerator having a storage ring configuration can generally keep the particle beam intact for sustained periods. A preferred form of target is of the internal type located in the ring, rather than an external type located on a dead end tangential offshoot from the ring. Often, an accelerator with an internal target is identified with respect to its internal target as a polarized internal target apparatus. In the internal target geometry, the beam can be recycled through the target. In use, the beam directed through the target would strike the target particles and scatter them, and this scatter would then be detected by sensor means located around the periphery of the target. Factors such as target density, beam density, etc., influence the scattering activity.

One important consideration in the selection of an internal target is the effect that multiple scattering will have on the electron beam. Based on this, the target thickness generally is limited. Also, polarization losses from ionization is an important factor in limiting the target thickness and in limiting the beam current.

Frequently, for polarized internal target apparatus, the target is hydrogen or heavy hydrogen (deuterium) gas. The atomic level of a hydrogen target gas will have a proton and an electron each having spins ($S_p$, $S_e$) according to any of the following four vector combinations: (1) plus plus; (2) plus minus; (3) minus minus: and (4) minus plus. These vector states are generally represented in approximately equal numbers in the natural state. The vector characterization of the spin protons $S_p$ and the spin electrons $S_e$ can be changed to make the target more sensitive to beam scattering. Under conventional theories, the more intensely polarized the target, the greater the sensitivity.

Accordingly, one object of the invention is an accelerator and particularly a polarized internal target apparatus having a target gas at a higher density and degree of polarization. A second object of the invention is an apparatus in which the degree of polarization of the target gas is achieved indirectly. Other objects will become apparent from the detailed description of the invention.

SUMMARY OF THE INVENTION

This invention relates to a polarized internal target apparatus with means for generating a polarized gas target, and to the polarized gas target itself, which has significantly improved density compared to known polarized gas targets for providing greater scatter sensitivity by a factor of possibly several orders of magnitude.

Briefly, the apparatus includes a polarized gas target comprising structural means having diametrically opposite openings for the passage of a particle beam and otherwise defining a cell region, mixture means for forming a mixture of the target gas atoms and alkali metal gas atoms and for introducing the mixture into the cell region, the alkali metal gas atoms being present in a small amount and usually less than about 5 atomic percent, and means for passing a high intensity polarized light source into the mixing means to cause the alkali metal gas atoms to become polarized, the polarized alkali metal gas atoms which became involved in spin exchange collisions with target gas atoms yielding polarized target gas atoms. The resulting atomic mixture when introduced into the cell region contains higher amounts of polarized target gas atoms useful in forming a target gas of higher density.

Figure 1:
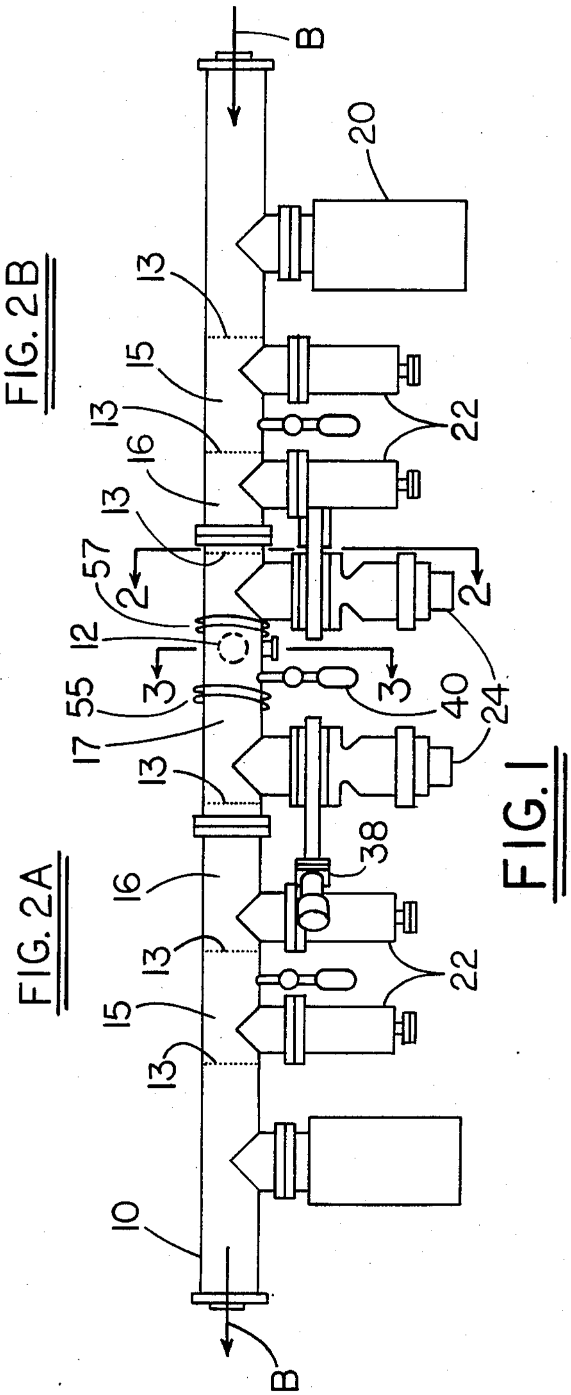
FIG. 1 is a side elevational view of a polarized internal target apparatus with an internal target of the type for which the subject invention pertains.
Figure 3:
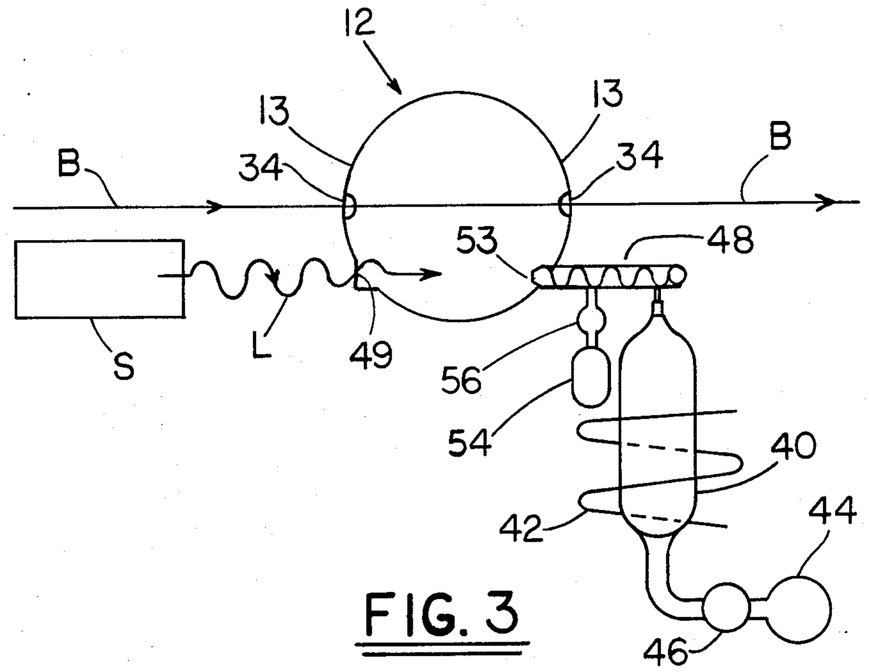
Figure 4:
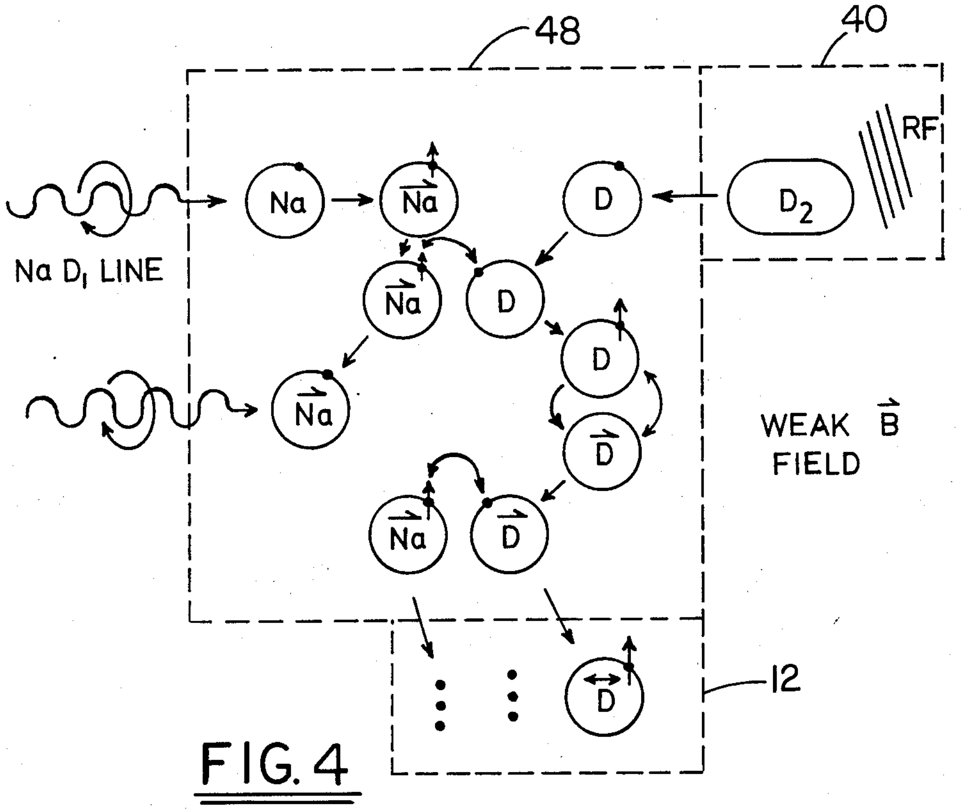

FIGS. *2a* and *2b* are detailed views, as seen generally from line 2—2 in FIG. 1, of the movable baffles used in connection with the apparatus and showing the same in a closed and open condition, respectively, and including the additional features of linear motion drives for moving the baffles;

FIG. 3 is an enlarged schematic view of certain portions of the target cell as seen generally from line 3—3 in FIG. 1;

FIG. 4 is a schematic replication of the polarizing action the laser and alkali and target atoms resulting in the polarization of the target cell.

DETAILED DESCRIPTION OF THE PREFERRED EMBODIMENT

Figure 2B:
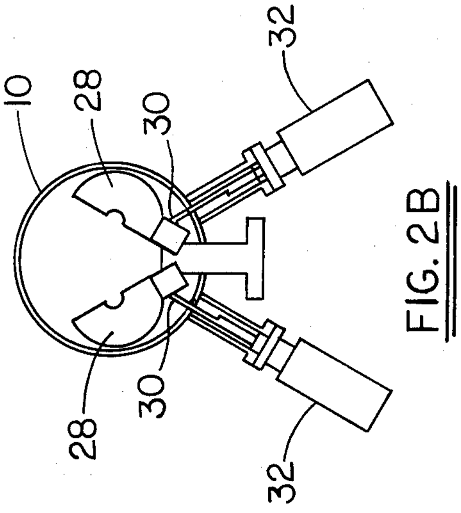
Figure 2A:
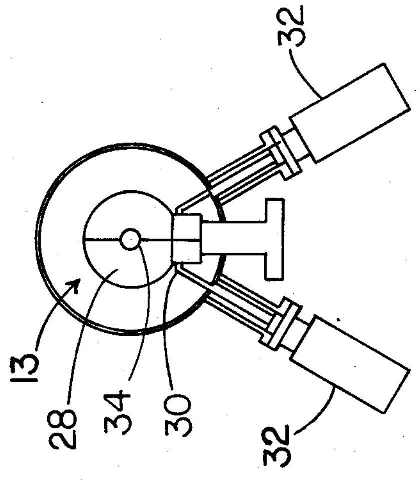

In FIGS. 1 and 2, an elongated beam tube 10 is illustrated, the same being in a polarized internal target apparatus. The apparatus has magnets and other means (not shown) for generating a beam and accelerating and centering it relative to the beam tube. In a preferred configuration, the beam tube 10 would be formed as an endless loop (not shown) to allow for a beam B to be redirected around the loop and stored. A target cell 12 is illustrated in the beam tube, being centered approximately in the tube itself, so that the beam B passes through the target cell. Closure baffles 13 would be provided upstream and downstream of the target cell 12 to define separate evacuation regions 15, 16 and 17 within the tube. Also, pumps illustrated as ion pumps 20, as titanium sublimation pumps 22, and as thermal molecular pumps 24 would immediately straddle the target cell region 17 at opposite upstream and downstream ends of the target cell 12.

The baffles 13 are of a two piece clam shell construction 28, being pivoted at lower axes 30 and moved by means of actuating linear motion drives 32. In the closed condition, the two clam shells components 22 abut one another along diametric halves while yet defining an opening 34 therein which would be centrally located and which would be aligned with the beam passing down the beam tube. In the open condition, the major portion of the beam tube 10 would be open.

The differential pumping system including the pumps 20, 22 and 24 would be used on the beam tube where the clam shell closures 13 would initially be open to allow for the generation of the beam through the target cell regions 15, 16 and 17 and target cell 12, specifically; and subsequently would be closed to evacuate the tube for and during the scattering experiment. The small central baffle and cell openings 34 for the beam will minimize the axial transport of any generated impurities axially of the beam tube that might tend to reduce the beam power. In general, the above construction is known in the art.

The particular features of the invention relate to the cell region and associated equipment with the cell region being defined by the beam tube or cell region with diametrically opposite openings for the passage of the particle beams. Means are provided for forming a mixture of target gas atoms and alkali metal atoms and introducing the mixture into the cell region. Means are also provided for passing a high intensity polarized light source into the mixture to cause the alkali metal gas atoms to become polarized. With the mixture having a higher concentration of atoms compared to the cell region, normal collisions between the target gas atoms and the alkali metal gas atoms result in the formation of polarized target gas atoms as illustrated in FIG. 4. Preferably, the mixing chamber is elongated and the polarized light source is transmitted in the direction of the elongation to achieve a higher level of polarization.

The alkali metal gas atoms may be atoms of sodium, potassium, lithium and the like and preferably sodium because of the ease of forming polarized atoms with laser power. Normally, the resultant polarization is either plus plus or minus minus, depending on the direction of polarization of the light source.

The region of the target 12 may be considered in the form of a spherical vessel having clam shell closures 13 which could be opened for the generation of the beam, and then closed and further defining small beam openings 34 that allow the beam B to pass through the target cell when the closures are closed. A dissociator 40 is used to feed the target atoms into the target cell 12, the same being in the form of a hollow tube having coil means 42 for generating an RF discharge field around the dissociator. Also, source means are provided at one end of the dissociator 40 to serve as a source 44 of molecules the target gas such as $D_2$ and $H_2$, which can be admitted by means of a control valve 46 into the dissociator. A polarization tube 48 is provided at the discharge end of the dissociator 40. The molecules when passed through the activated RF discharge field 42 are converted from gas target gas molecules $D_2$ or $H_2$ into the deuterium or hydrogen atoms D or H for discharge into the polarization tube 48. A second inlet is also made to the polarization tube 48, being connected to a source 54 of alkali metal gas atoms as controlled by valve means 56. In normal use, the target gas (deuterium or hydrogen) atoms are mixed with the alkali atoms at a ratio of about 20-200:1 and preferably about 100:1. The polarization tube 48 opens at its end remote from the target gas inlet into the target cell 12; and the polarization tube is laterally offset from the line of passage normally taken by the beam B so as not to interfere with the beam of electrons.

A photon beam L of polarized light L, such as from an intense light source S in the form of a laser or the like, would be adapted to pass a through transparent window 49 on the side of the target cell and into and through the polarization tube 48. The photon beam of polarized light L has the capacity then to polarize the alkali atoms in the region of the beam according to a phenomena known as optical pumping. The frequency of the light is dependent on the particular alkali metal. Wavelengths for Na and K are 590 nm and 770 nm, respectively.

The target atom (hydrogen or deuterium, typically) is generated in the dissociator 40 and enters the optical pumping region in the polarization tube 48 to mix with the alkali metal gas atoms. Polarization of the alkali metal gas atoms is achieved by means of the laser or the photon beam as illustrated in FIG. 4. In the absence of a strong magnetic field, the nuclear spin and electron spin are coupled system by virtue of the hyperfine interaction. When a spin exchange collision occurs between the alkali metal gas atom and the target gas atom, it momentarily decouples these spins due to the locally strong magnetic moments of the interacting electrons. During a spin exchange interaction, the nucleus is a spectator. After spin exchange scattering (different from beam scattering) involving the polarized alkali atom and the target atom, the process would be repeated to increase the density of the polarized target atoms.

In the nuclear polarization, the spin exchange collision occurs with the polarized alkali atom and the target gas atom which yields a polarized target gas atom electron. The polarized target gas atom electron then by its hyperfine interaction transfers the polarized electron spin $S_e+$ for example, to the proton to an achieve an $S_p+$ spin. The neutralized alkali atom is then repolarized by circularly polarized photons from the laser and once again by a second collision exchange and a second hyperfine reaction generates an additional polarized target gas electron spin. The resulting polarized target gas atoms are discharged continuously into the target cell 12. Based on theory, it is expected that very few spin exchange collisions would be required to polarize the entire target to the ++ state. The level is estimated to be as low as perhaps 5 scatterings per atom which would thereby generate essentially a maximum polarization of the target gas to the condition of $S_e$ and $S_p$ ++ states entirely.

The density of the polarized target gas nuclei depends directly on the optical pumping rate of the alkali atoms which in turn depends on the power of the laser. It is usually desirable to achieve as high a pumping rate as possible. The main loss will be a portion of the polarized target gas atoms which may leak from the target cell through the holes provided for the beam B to pass through the target end closures. An enclosure hole (which is about 5–15 mm and preferably about 5–10 mm) allows the beam to pass through without striking the peripheral structure thereof while yet minimizing the target losses because of leakage through the end closures. Another main loss will be the target depolarization before scattering. The target thickness may be increased by applying a more powerful laser to provide for the polarized pumping. It may also be increased by reducing the hole size for the electron beam to minimize the leakage. Another method of increasing the thickness is by cooling the target cell. One factor to consider in this target design is the number of collisions that would occur, which would be determined by the number of the alkali metal gas atoms to be polarized as well as the number of polarized target gas atoms for the desired result.

It is important to the polarization of the target gas nuclei to perform the spin exchange scatter at low fields of magnetism of perhaps only a few gauss. This small field is several times the magnetic field of the earth or about 3–50 gauss and preferably about 4–6 gauss, so that it will dominate the spin alignment, as contrasted from the earth so dominating, but it also is sufficiently low so that the nuclear spin would not be decoupled from the electron spin. This would be contrary to what might be considered a conventional atom beam source for obtaining such polarization.

The continued polarization and optical pumping provides most if not all of the polarized atoms of the target gas having the ++ electron $S_e$ and proton $S_p$ spin polarization. The time between collisions is estimated in terms of microseconds ($10^{-6}$ seconds), whereas the hyperfine recoupling time is estimated in nanoseconds ($10^{-9}$ seconds). Consequently, there is ample time for rearrangement of the nuclear spin between the atomic collisions subsequent to each and every hyperfine decoupling. The physical limit on the target density is determined by comparing varying time scales, however, other factors such as laser power and the like currently provide limitations as to the target density.

It is expected that the escape of the polarized atoms from the target region is at least offset by the continued optical pumping and spin exchange of the newly introduced target gas and alkali metal gas atoms so that a stabilized target of high density and polarization can be generated and sustained.

The polarized or aligned target gas is suited for nuclear physics studies in an electron storage ring accelerator. The target gas atoms undergo the electron spin exchanges with a highly polarized alkali gas (sodium, for example), and this polarization is transferred to the target gas nuclei via spin exchange collisions and the hyperfine interaction. The target gas nuclei obtain their tensor polarization or alignment through repeated alkali polarization and electron spin exchange/hyperfine interactions. The alkali vapor polarization is maintained by optical pumping techniques using a high intensity laser, for example. The target gas polarization process is schematically represented in FIG. 4.

The basic components needed to complete this spin exchange polarization include the dissociator 40 feeding atomic target gas into the spin exchange or polarization tube 48. The alkali metal gas source 54 provides the desired alkali gas density in the polarization tube 48. A set of Helmholtz coils 55 and 57 provide a weak magnetic field (5 Gauss) aligned along the axis of the polarization tube. Polarized target gas and alkali atoms flow out the end of the polarization tube and into the target cell 12. The mixing chamber 48 is elongated and constructed with an end restriction 53 so as to contain the target gas and alkali metal gas atoms for a time sufficient (e.g., 1 to 5 milliseconds) to allow them to mix and complete the desired number of spin exchange collisions. This technique of polarizing or aligning the target gas is beneficial because of its high output and mechanical simplicity (no sextupole magnets, high power radio frequency source or high-speed vacuum pumps) relative to conventional atomic beam sources.

It is expected that the initial beam tube vacuum might be less than $10^{-9}$ torr; whereupon the scattering experiment would involve material discharge into the beam tube which would reduce the vacuum. The differential pumping system including the pumps and ultra high vacuum valve 38 is used to exhaust these target regions 17 to maintain high vacuums.

Thus, the target region 17 is expected to be at $2\times10^{-6}$ torr, the adjacent regions 16 at $2\times10^{-8}$ torr, and the outermost regions 10 at $10^{-9}$ torr. Moreover, the molecular target source 44 is expected to be at $10^{-1}$ torr vacuum, the target atoms in the polarization tube 48 at $10^{-2}$ torr, and the target atoms in the target cell 12 at $10^{-4}$ torr Likewise, the alkali metal gas atoms are expected to be at $2\times10^{-4}$ torr at the source 54, at $10^{-4}$ torr in the polarization tube 48, and at $10^{-6}$ in the target cell 12.

The aligned and polarized target is estimated to have a thickness of approximately $10^{14}$ atoms/cm$^2$ and the target cell itself to be 10 cm in diameter. With this target thickness, the target density is in the order of $10^{13}$ atoms per cubic centimeter and the leakage rate from the cell is in the order $4\times10^{17}$ atoms/second for a temperature near T=500° K. A 2 Watt laser may be desirable to produce the $4\times10^{17}$ polarized atoms per second, while a 20 Watt laser may be desirable to optically pump a target of $4\times10^{18}$ polarized atoms per second to provide a thicker target. Using sodium as the alkali gas, the cell can be illuminated by circularly polarized Na $D_1$ light (5896 Å) from a dye laser, which in effect pumps angular momentum into the Na atom vapor by spin polarizing the outer unpaired electron of a Na atom. The electron beam is estimated to be of the order of 1 giga-electronvolt in energy with a circulating current of 100 milliamps with a storage time extending to perhaps 8 hours.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of this invention in which an exclusive property or privilege is claimed are defined as follows:

1. A polarized internal target apparatus, comprising the combination of structural means having diametrically opposite openings for the passage of a particle beam and otherwise defining a cell region, means for forming a mixture of target gas and alkali gas atoms at a ratio of the order of about 20–200:1 and introducing the mixture to the cell region, means for passing a high intensity polarized light source into the mixture to polarize the alkali atoms, the polarized alkali metal gas atoms in collisions with the target gas atoms causing polarization of the target gas atoms, and means for subjecting the target cell to a magnetic field of the order of 3–50 gauss, the target gas atoms being hydrogen or deuterium and the alkali atoms being sodium or potassium.

2. The polarized internal target apparatus of claim 1, further including means for evacuating the target cell region.

* * * * *